United States Patent
Kong et al.

(10) Patent No.: US 10,135,643 B1
(45) Date of Patent: Nov. 20, 2018

(54) DECISION FEEDBACK EQUALIZER WITH DISTRIBUTED R-C NETWORK

(71) Applicant: Oracle International Corporation, Redwood City, CA (US)

(72) Inventors: Long Kong, Campbell, CA (US); Ranjan Vaish, Fremont, CA (US); Muthukumar Vairavan, Sunnyvale, CA (US); Zuxu Qin, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/655,034

(22) Filed: Jul. 20, 2017

(51) Int. Cl.
   - H03H 7/30 (2006.01)
   - H03H 7/40 (2006.01)
   - H03K 5/159 (2006.01)
   - H04L 25/03 (2006.01)

(52) U.S. Cl.
   CPC .............................. H04L 25/03057 (2013.01)

(58) Field of Classification Search
   CPC ......... H04L 25/03057; H04L 25/03885; H04L 25/03343
   See application file for complete search history.

(56) References Cited

U.S. PATENT DOCUMENTS

| | | | |
|---|---|---|---|
| 7,782,935 B1 * | 8/2010 | Wong | H03H 11/26 375/229 |
| 7,822,114 B2 | 10/2010 | Bulzacchelli | |
| 8,879,618 B2 | 11/2014 | Abdalla | |
| 8,923,382 B2 | 12/2014 | Ito | |
| 2014/0277812 A1 * | 9/2014 | Shih | G05F 1/563 700/298 |
| 2015/0256363 A1 | 9/2015 | Shvydun | |

* cited by examiner

*Primary Examiner* — Shuwang Liu
*Assistant Examiner* — Gina McKie
(74) *Attorney, Agent, or Firm* — Meyertons, Hood, Kivlin, Kowert & Goetzel, P.C.

(57) ABSTRACT

An embodiment includes a first feedback tap, a second feedback tap, and a summation circuit. The summation circuit may include a first load and a second load coupled to each other at an internal circuit node, and coupled in series between a power supply node and an output node. The summation circuit may be configured to receive, via a serial communication link, an input signal indicative of a series of data symbols, and to generate an output voltage level on the output node based upon a current data symbol. The first feedback tap, coupled to the output node, may be configured to sink a first current from the output node based upon a first previously received data symbol. The second feedback tap, coupled to an intermediate circuit node, may be configured to sink a second current from the intermediate circuit node based upon a second previously received data symbol.

20 Claims, 7 Drawing Sheets

US 10,135,643 B1

DECISION FEEDBACK EQUALIZER WITH DISTRIBUTED R-C NETWORK

BACKGROUND

Technical Field

The embodiments disclosed herein relate to high performance computing network systems, and more particularly, to data recovery methods for systems using serialized data transmission.

Description of the Relevant Art

Communication between multiple processors may utilize high-speed serial communication. Several examples of high-speed serial communications standards include wired standards, such as, Ethernet, Universal Serial Bus (USB, and USB 3.0 in particular), and Serial AT Attachment (SATA). While these examples typically involve communication over a length of cable between two circuit boards, high-speed serial communications may be used between devices on a common circuit board or between functional blocks within a single IC. Serial communication is also used in wireless standards, such as Wi-Fi™ and Bluetooth™.

Various techniques may be employed to increase data speed in serial communication networks. As data speeds increase, however, transmitting and receiving data signals may increase a number of errors in received data. For example, variations of voltage levels of a received stream of data symbols from a transmitter may reduce an accuracy of determining the data that was sent.

SUMMARY OF THE EMBODIMENTS

Systems and methods for detecting and decoding received data symbols in high-speed serial communications are contemplated. An embodiment of an apparatus may include a first feedback tap circuit, a second feedback tap circuit, and a summation circuit that includes a first load circuit and a second load circuit coupled to each other at an internal circuit node, and coupled in series between a power supply node and an output node. The summation circuit may be configured to receive, via a serial communication link, an input signal indicative of a series of data symbols, and to generate an output voltage level on the output node based upon a current data symbol. The first feedback tap circuit, coupled to the output node, may be configured to sink a first current from the output node based upon a first previously received data symbol. The second feedback tap circuit, coupled to an intermediate circuit node, may be configured to sink a second current from the intermediate circuit node based upon a second previously received data symbol.

In a further embodiment, the first load circuit and the second load circuit may include respective resistors with resistance values that are substantially the same. In one embodiment, to receive an input signal indicative of a series of data symbols, the summation circuit may be further configured to receive a differential data input signal including a first data input signal and a second data input signal.

In another embodiment, each data symbol of the plurality of data symbols may encode a plurality of data bits. In an embodiment, to generate the first current, the first feedback tap circuit may be further configured to receive a plurality of feedback signals with voltage levels corresponding to the values encoded in the first received data symbol.

In one embodiment, the first previously received data symbol may precede the current data symbol and the second previously received data symbol may precede the first previously received data symbol. In a further embodiment, a third load circuit may be coupled between a second internal node and the power supply node.

Figure 1:
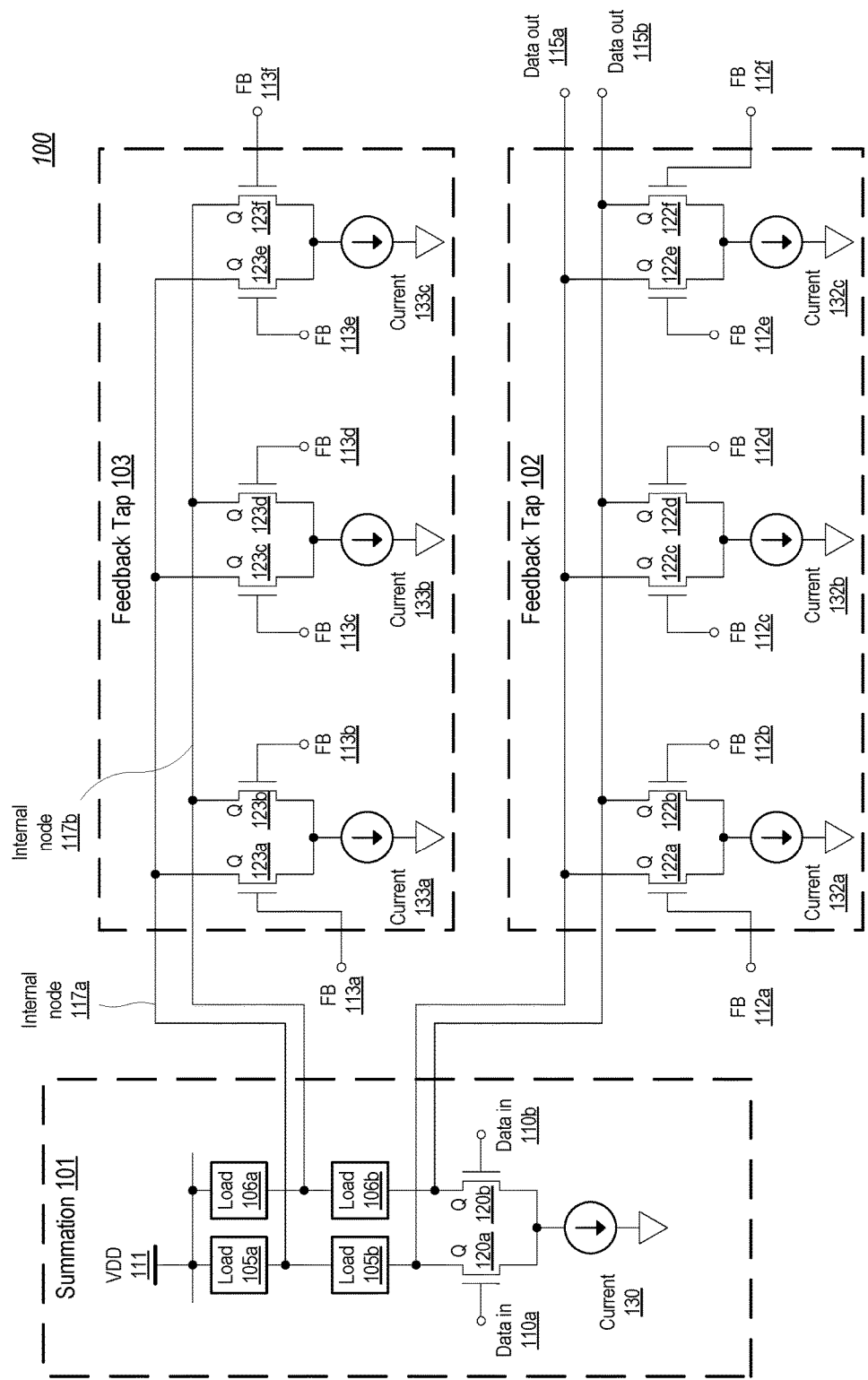
FIG. 1 illustrates a block diagram of an embodiment of a decision feedback equalizer (DFE) circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

High-speed serial communication channels may employ various communication protocols to transmit information between different circuit blocks within a computing system. Some protocols utilize differential signaling, in which two signals are transmitted and received, and a value of a data symbol is determined by a difference between voltage levels the two data signals at a given sample time. As used herein, a "data symbol" (or simply "symbol") refers to a unit of information exchanged between a transmitter and a receiver, and whose value is based upon voltage levels of the data signals at a particular sample time. Some communication protocols may encode a single data bit per symbol, while communication protocols may encode two or more data bits into each symbol. Although such embodiments may actually transmit more than one data bit at a time, since the data symbols are transmitted one at a time, these embodiments may still be referred to as forms of serial communication.

As data speeds increase, an amount of time for receiving and decoding each data symbol ("symbol time") may decrease. Variation in voltage levels of a received stream of data symbols from a transmitter may be difficult to resolve in this shortened symbol time. Additionally, in a wired communication system, higher frequency signals become more sensitive to impedance in the wires. For example, improperly matched impedances may result in signal reflections and other forms of symbol interference in the communication system. Interference resulting from one or more previously sent data symbols (referred to herein as "intersymbol interference," or "ISI" for short) may affect a voltage level of a current data symbol.

One available technique for reducing voltage level variations in received data signals is to use a decision feedback equalizer (DFE) circuit. To reduce the impact of ISI, a DFE circuit may modify detected voltage levels associated with a current symbol using a decoded value of one or more previously sent data symbols, thereby compensating for changes introduced to the detected voltage levels due to reflections from impedance mismatches, bandwidth limitations of the communication channel, and the like. While providing improved signal integrity, a DFE circuit may limit the response time of a receiver circuit, which, in turn, limits communication bandwidth. Embodiments of a decision feedback equalizer circuit illustrated in the drawings and described below may provide techniques for reducing the effects of ISI in a communication channel, while decreasing response time of a receiver circuit and improving the bandwidth of the communication channel.

Referring to FIG. 1, a block diagram of an embodiment of a decision feedback equalizer (DFE) circuit is illustrated. In the illustrated embodiment, DFE circuit 100 includes summation circuit 101 coupled to feedback tap circuit 102 and feedback tap circuit 103. Summation circuit 101 includes loads 105*a-b* and 106*a-b*, current sink 130, as well as devices 120*a-b*. Feedback tap circuit 102 includes devices 122*a-f* and current sinks 132*a-c*. Feedback tap circuit 103 similarly includes devices 123*a-f* and current sinks 133*a-c*.

Summation circuit 101 is configured to receive differential data input signals, data in 110*a* and data in 110*b*. In various embodiments, a difference in the voltage levels of data in 110*a* and data in 110*b* may correspond to a value of a particular symbol, which may encode logic values for one or more data bits. During operation, summation circuit 101 may amplify a voltage difference between voltage levels of data in 110*a* and data in 110*b* to generate signals data out 115*a* and 115*b*. In the illustrated embodiment, data in 110*a* and data in 110*b* are differential signals, and, therefore, either data in 110*a* or data in 110*b* has a higher voltage level than the other data in signal. Either Q120*a* or Q120*b* may, therefore, allow more current to be sunk via current sink 130, and therefore, pull a corresponding one of data out 115*a* or data out 115*b* towards a ground reference level, while the other one of the data out signals is pulled towards VDD 111 via a corresponding one of load 105*a-b* or load 106*a-b*. Voltage levels of data out 115*a* and data out 115*b* may then be used to determine the value for a received symbol.

As mentioned above, when a particular symbol is being received, the voltage levels of data in 110*a* and data in 110*b* corresponding to the particular symbol may be degraded by one or more previously received symbols. In some embodiments, a data symbol immediately preceding the current data symbol may have a greatest influence on the voltage levels of the current data symbol. As used herein, the terms "immediately preceding" and "immediately precedes" refers to a data symbol received prior to a current data symbol with no other symbol received in between.

To compensate for the degradation of the voltage levels of data in 110*a* and data in 110*b*, feedback tap circuit 103 and feedback tap circuit 102 selectively sink current from internal nodes 117*a* and 117*b* using values of one or more previously received symbols to correct voltage levels of data out 115*a* and data out 115*b*. As described below in more detail, by employing two feedback tap circuits, each selectively sinking current from different internal nodes associated with summation circuit 101, the overall capacitive load associated with the feedback tap circuits may be divided onto separate circuit nodes. By dividing the capacitive load, time constants associated with internal nodes 117*a* and 117*b* may be reduced, allowing faster operation of summation circuit 101, thereby increasing the bandwidth of DFE circuit 100.

The signals data in 110*a* and data in 110*b* correspond to a differential serial data input signal sent from a serial data transmitter. In the illustrated embodiment, each of data in 110*a-b* are generated by the transmitter using one voltage level from a set of four voltage levels, referred to herein as V1, V2, V3, and V4. V1 may correspond to a lowest voltage level and V4 to a highest voltage level, with V2 and V3 corresponding to voltage levels between V1 and V4. Using such a data signal generation scheme, more than one data bit value may be decoded from a single data symbol. For example, a pulse amplitude modulation (PAM) encoding scheme, such as, for example, PAM-4, may be used to encode two data bits into each data symbol. Although four voltage levels are described, in other embodiments, any suitable number of voltage levels may be employed for encoding data bits in a data symbol.

Based on the voltage levels of data in 110*a* and data in 110*b*, device Q120*a* and Q120*b* each allow a respective corresponding amount of current to flow to the ground node. For example, if data in 110*a* is at level V1, then Q120*a* may allow little to no current to flow, while if data in 110*b* is at level V4, then Q120*b* may allow much more current to flow via current sink 130. The amount of current flowing through Q120*b* is drawn from loads 106*a-b*. Each of loads 105*a-b* and 106*a-b* include at least one resistive element, such as, for example, a resistor or a biased device. The more current through loads 106*a-b*, therefore, the larger the voltage drop on data out 115*b* from the level of VDD 111. A higher voltage level on data in 110*b*, therefore, results in a lower voltage on data out 115*b*. Data out 115*a* is similarly influenced by the voltage level of data in 110*a*, and, in the current example, the voltage level of data out 115*a* will be high due to little or no current flowing through loads 105*a-b*. It is noted that the voltage levels on data out 115*a* and 115*b*, in the illustrated embodiment, are inversely related to the voltage levels of the respective data in 110*a* and 110*b*.

Each of the devices described above, such as, e.g. Q120*a*, may, in various embodiments, correspond to metal-oxide semiconductor field-effect transistors (MOSFETs) or any other suitable type of transconductance device. Although single devices are depicted in the diagram of FIG. 1, in other embodiments, multiple devices may be used in parallel to form any of the above devices.

As described above, the transmission of high-speed data signals may result in reflections or other forms of ISI, which may impact a voltage level of a subsequently transmitted data symbol. Continuing the example, if the previous levels of data in 110*a* and data in 110*b* were opposite of the current levels, i.e., V4 and V1, respectively, then the level of data in 110a may be higher than the desired V1 due to the previous high voltage of V4. The level of data in 110b, similarly, may be lower than the desired V4 due to the previous low voltage of V1. Feedback tap circuit 102 is included to help compensate for the change in voltage level due to interference from previously transmitted symbols.

In the illustrated embodiment, feedback tap circuit 102 receives six feedback signals. FB 112a-f. FB 112a, 112c, and 112e correspond to a previous voltage level of data in 110a, while FB 112b, 112d, and 112f correspond to a previous voltage level of data in 110b. Signals FB 112a-f may correspond to binary logic values, rather than to one of voltage levels V1-V4. As noted above, the voltage levels of data out 115a and 115b are inversely related to the voltage levels of data in 110a and 110b, in the illustrated embodiment. The previous level of V4 on data in 110a, in some embodiments, may result in logic low values on FB 112a, 112c, and 112e. These logic low values result in devices Q122a, Q122c, and Q122e being disabled, and blocking a flow of current from data out 115a into current sinks 132a-c. In contrast, the value of V1 previously on data in 110b, may result in logic high values for signals FB 112b, 112d, and 112f. These high logic values activate devices Q122b, Q122d, and Q122f, thereby allowing a flow of current from data out 115b into current sinks 132a-c. This additional current flow may compensate for the level of data in 110b not reaching the desired V4 level and pull data out 115b towards the ground node as desired.

As used and described herein, a "low logic level," "low," or a "logic 0 value," corresponds to a voltage level sufficiently low to enable a p-channel MOSFET, and a "high logic level," "high," or a "logic 1 value," corresponds to a voltage level sufficiently high to enable an n-channel MOSFET. In various other embodiments, different technology, including technologies other than complementary metal-oxide semiconductor (CMOS), may result in different voltage levels for "low" and "high."

Feedback tap circuit 103, in the illustrated embodiment, is also included in DFE circuit 100 to further compensate for the interference resulting from previously transmitted data symbols. While feedback tap circuit 102 provides feedback to summation circuit 101 based on the previous data symbol, feedback tap circuit 103 provides feedback based on a data symbol received two symbols prior to the current symbol. For the sake of clarity, the data symbol received prior to the current data symbol will be referred to as the "first order symbol" and the data symbol received prior to the first order symbol will be referred to as the "second order symbol."

Feedback tap circuit 102 receives feedback signals FB 112a-f based on the first order symbol, while feedback tap circuit 103 receives feedback signals 113a-f based on the second order symbol. Signals FB 113a-f are coupled to respective devices Q123a-f. Each device Q123a-f is coupled to one of current sinks 133a-c. Feedback tap circuit 103 operates similar to feedback tap circuit 102 with the exception that the feedback produced is based on an older data symbol. Reflection effects may persist for more than a single data symbol time and, therefore, a respective feedback tap circuit for each of as many previous data symbols as is desired may be employed. While the illustrated embodiment includes two feedback tap circuits, 102 and 103, other embodiments may utilize any suitable number of feedback tap circuits. In addition, while the reflection effects may persist for more than one data symbol time, the effects may subside over time. A second order symbol may, therefore, not have as much impact on the current data symbol as a first order symbol. Current sinks 133a-c in feedback tap circuit 103, therefore, may sink a reduced amount of current as compared to current sinks 132a-c in feedback tap circuit 102.

It is noted that feedback tap circuit 103 is not coupled to data out 115a-b in the same manner as feedback tap circuit 102. Instead, devices Q123a-f are coupled either between loads 105a and 105b or between loads 106a and 106b. The circuits of each feedback tap circuit 102 and 103 include an amount of capacitance due to, for example, capacitive devices in the feedback circuits (not shown) or due to parasitic capacitance inherent in devices and interconnect. The capacitance associated with each of feedback tap circuits 102 and 103, when combined with the resistive elements of loads 105a-b and 106a-b create resistive-capacitive (RC) networks with associated time constants. These time constants may correlate to a time required for the signals data out 115a-b to settle to a particular output voltage in response to changes in data in 110a-b and feedback tap circuits 102 and 103. A larger time constant may correspond to an increased slew rate on data out 115a-b. By separating feedback tap circuit 103 from feedback tap circuit 102 using loads 105b and 106b, the time constants of the RC network may be reduced. Additional details regarding the reduction of the RC time constant will be presented below. In some embodiments, additional feedback tap circuits may be separated from feedback tap circuits 102 and 103 with additional load circuits.

It is also noted the embodiment of FIG. 1 is merely an example for the purpose of demonstrating a DFE circuit in a serial communication receiver. DFE circuit 100 has been simplified to show only components used in conjunction with the disclosed concepts. In other embodiments, additional components, such as, e.g., additional feedback tap circuits may be included to provide feedback for third order symbols, fourth order symbols, and so forth. In some embodiments, components may be arranged differently.

Figure 2A:
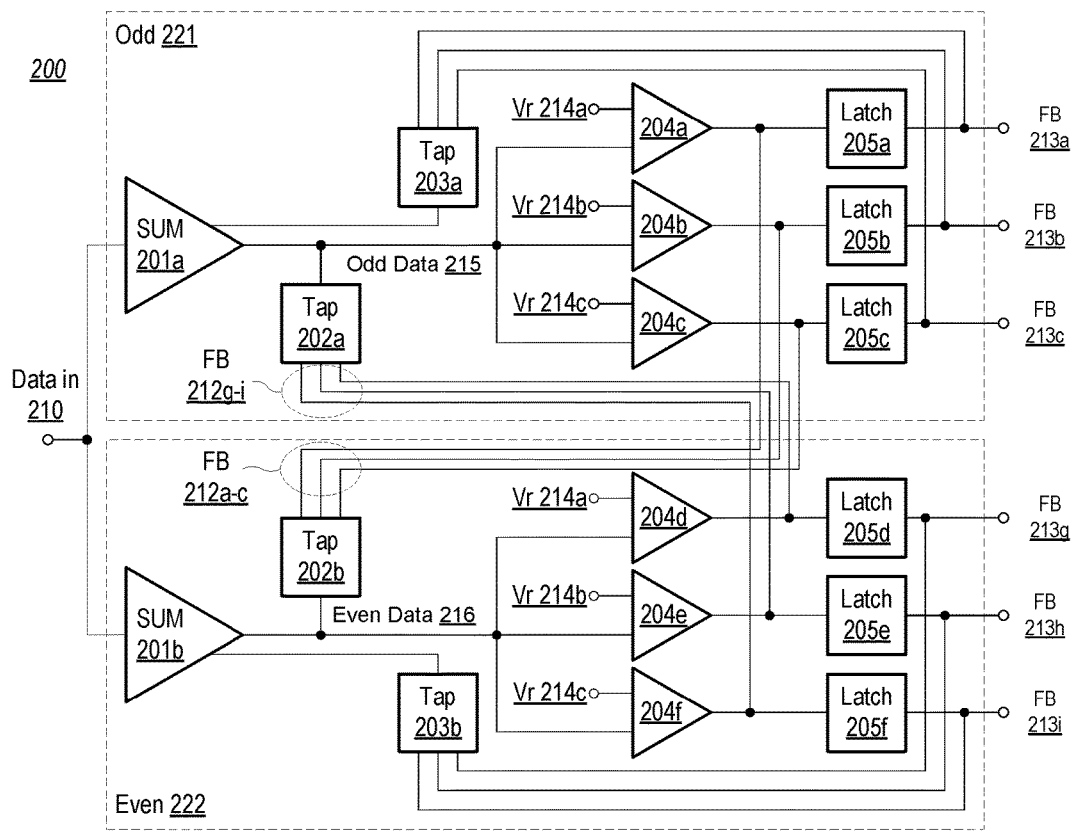
FIG. 2A shows a block diagram of an embodiment of a serial communication receiver including odd and even receiving circuits.

One or more DFE circuits, such as DFE circuit 100, may be utilized in a serial communications receiver. Turning to FIG. 2A a block diagram of an embodiment of a serial communication receiver including odd and even receiving circuits is depicted. A timing diagram of signals that may be associated with the operation of the embodiment of FIG. 2A is illustrated in FIG. 2B.

Serial communication receiver 200 in FIG. 2A includes two DFE circuits, one for decoding each odd data symbol in a received series of data symbols and one for decoding each even data symbol of the series. Additionally, serial communications receiver 200 includes summation circuits (SUM) 201a and 201b, feedback tap circuits 202a-b and 203a-b, voltage comparators 204a-f, and data latches 205a-f. Data symbols are received via signal data in 210, which is coupled to both summation circuits 201a and 201b.

It is noted, that to aid in clarity, each of the signals in FIG. 2A are shown as a single signal. In a differential signaling system, however, each illustrated signal may correspond to a pair of differential signals. In such embodiments, comparators 204a-f and latches 205a-f may be duplicated, one for each of a pair of differential signals.

Figure 2B:
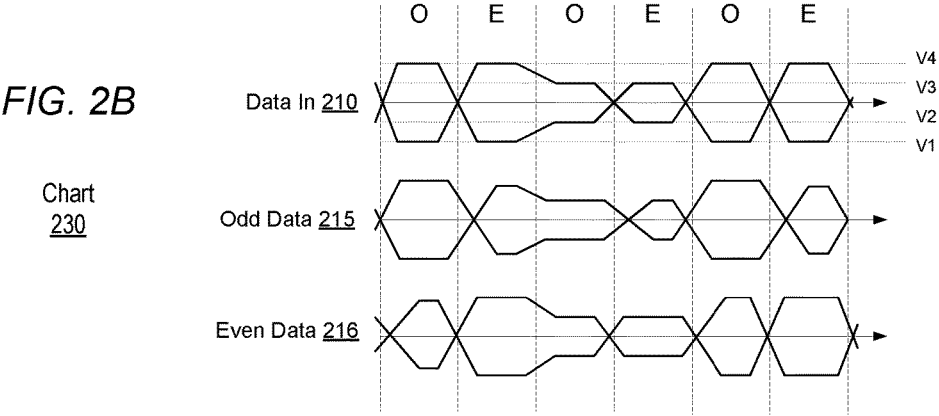
FIG. 2B shows an embodiment of serialized data in a serial communication receiver that includes odd and even receiving circuits.

FIG. 2B shows a timing diagram of signals that may be associated with the embodiment of FIG. 2A. Serial communication receiver 200 receives a series of data symbols on data in 210, and for each data symbol, either odd DFE circuit 221 or even DFE circuit 222 decodes the received symbol. Chart 230 in FIG. 2B illustrates an example of how a series of data symbols may be received. Data in 210 includes a pair of differential signals in which each signal may be set to one of four voltage levels, V1 through V4 as described above and shown on the data in 210 waveform. In some embodiments, the differential pair of signals may not both be at the same voltage level for a duration of a data symbol time. In various embodiments, both signals being at the same voltage level at the same time may be considered an error condition, or in some cases, a special control character, such as, for example, an idle character.

The vertical dashed lines indicate individual data symbol times and each is labeled with either an "O" or an "E" to indicate if the corresponding symbol time is an odd or even symbol. It is noted that the odd data symbols immediately precede subsequent even data symbols, and vice versa. Data in 210, in the illustrated embodiment, represents data signals received from a transmitter circuit. Odd data 215 represents the output of summation circuit 201a, including the effects of feedback tap circuits 202a and 203a, and even data 216 represents the output of summation circuit 201b, including effects of the feedback tap circuits 202b and 203b.

Each of odd DFE circuit 221 and even DFE circuit 222 may operate in a similar fashion to DFE circuit 100 as described above in regard to FIG. 1. Each of the first order feedback tap circuits, taps 202a-b, receive feedback signals (FB 212a-c for tap 202b and FB 212d-f for tap 202a) based on first order symbols (i.e., the data symbol received one symbol time earlier). It is noted that in this odd-even receiving system, the first order feedback symbols are received from the opposite DFE circuit, e.g., tap 202a, in odd DFE circuit 221, receives FB 212g-i from even DFE circuit 222. Likewise, tap 202b, in even DFE circuit 222, receives FB 212a-c from odd DFE circuit 221. In contrast, the second order tap circuits, taps 203a-b, receive feedback signals based on the second order data symbols (i.e., data symbols received two symbol times earlier). Since the second order data symbols are decoded within the DFE circuit that is decoding a current data symbol, these feedback signals are received from within their respective DFE circuits.

Summation circuits 201a and 201b generate odd data 215 and even data 216, respectively. Taking odd DFE circuit 221 as an example, summation circuit 201a generates odd data 215 based on data in 210 as well as first order tap 202a and second order tap 203a. The effects of taps 202a and 203a, in some embodiments, cause summation circuit 201a to generate odd data 215 with odd data symbols that are easier to decode, while the even data symbols may be harder to decode. As shown in chart 230, odd data 215 has odd data symbols with large data eyes, sometimes larger than the corresponding symbol on received data in 210. The even data symbols, however, may have smaller data eyes than are depicted in the waveform for data in 210. As referred to herein, a data eye refers to the separation of voltage levels between a pair of differential signals over a data symbol time. The larger the data eye, the easier the symbol may be to decode. Even data 216, in contrast, may be generated with large data eyes on the even symbols and smaller data eyes on the odd symbols.

The data symbols are decoded using voltage comparators 204a-f. Comparators 204a-c are used to decode the odd data symbols, and comparators 204d-f are used to decode the even symbols. The outputs of these comparators, in the illustrated embodiment, correspond to the first order data symbols for generating FB 212a-c and FB 212g-i. Referring again to odd DFE circuit 221 as an example, each comparator 204a-c compares a voltage level of odd data 215 to a respective reference voltage, Vr 214a-c. A voltage level of each of Vr 214a-c may be selected to be between each of the four voltage levels of data in 210. For example, Vr 214a may be set between V1 and V2, Vr 214b set between V2 and V3, and Vr 214c set between V3 and V4. If V1 is a lowest voltage level and V4 the highest of the four levels, then the outputs of comparators 204a-c may all be asserted when odd data 215 is at V4 and none of the outputs asserted when odd data 215 is at V1. A level of V2 may cause just comparator 204a to assert its output, while a level of V3 may cause comparators 204a and 204b to assert their outputs. In the illustrated embodiment, comparators 204d-f in even DFE circuit 222 use the same reference voltages, Vr 214a-c. In other embodiments, however, comparators 204d-f may receive reference voltages that are different from the reference voltages used in odd DFE circuit 221.

The outputs of comparators 204a-f, in the illustrated embodiment, are stored in data latches 205a-f based on a sample clock signal included in serial communications receiver 200. In order to store multiple samples of a particular data symbol, some embodiments may employ multiple data latches coupled to each comparator 204a-f. The values stored in each data latch 205a-f correspond to the second order feedback signals, FB 213a-c and FB 213g-i.

As disclosed above in regard to FIG. 1, the second order taps 203a-b are coupled to summation circuits 201a-b, respectively, such that there is a non-zero amount of impedance, including a non-zero amount of resistance, between the first order taps and the second order taps. This impedance may result in the summation circuits being capable of generating outputs in less time than when little to no impedance is between the first and second order taps.

The block diagram and chart of FIG. 2A and FIG. 2B are presented as an example of a serial communication receiver. Although two feedback tap circuits are presented for each of the illustrated DFE circuits, in other embodiments, any suitable number of additional feedback tap circuits may be included to provide feedback for third or higher order symbols.

As previously stated, the first order and second order feedback taps may be included in a serial communication receiver to mitigate reflections or other interference that first and second order data symbols may have on a data symbol currently being received. Moving to FIG. 3, a timing diagram illustrating two embodiments of serialized data in an embodiment of a serial communication receiver is depicted. In the illustrated embodiment, chart 301 shows a desired response of voltage (y-axis) versus time (x-axis) for data in signals utilizing four voltage levels for a differential data signal. Chart 302, in contrast, shows data in signals with interference from previously received data symbols.

This interference may be caused by "reflections" due to impedance changes in the signal path, a "skin effect" of the conductor used to carry the data stream, or other known sources of interference. Interference may continue into the next data bit time, thereby interfering with a logic level of a subsequent data bit. In high speed serial communication links, the interference from a first data bit may extend for two or more symbol times, although the amount, or "magnitude," of the interference may diminish for each subsequent data bit. This phenomenon of interference from previously received data bits may be referred to as "intersymbol interference" (ISI).

Chart 301 depicts what, in some embodiments, represents desired signal waveforms. Chart 301 illustrates a composite of multiple values for a pair of differential data signals superimposed on top of one another to illustrate resulting data eyes. Each of the differential signals may be set to one of the four voltage levels, V1 to V4. The more separation between the voltage levels of each of the differential signals, the easier it may be to decode the respective data. As described in regard to FIG. 2A, comparators 204*a-c* compare odd data 215 signals to one of three reference voltages, labeled here as Vr 314*a-c*. If odd data 215 is represented by the waveforms of chart 301, then the centers of the data eyes include good separation among the four voltage levels, V1-V4, and comparators 204*a-c* may have a suitable time period available to sample the symbols conveyed by data in 215.

In contrast, if the waveforms of chart 302 were to correspond to data in 215, then comparators 204 *a-c* may produce errors as some of the data symbols received on data in 215 have levels very near the three reference voltages Vr 314*a-c* rather than at the intended voltages of V1-V4. These indeterminate data eyes may result in a loss of performance due to having to resend data received with errors and may also result in an unacceptable error rate, which may cause a time consuming recalibration of the serial communication receiver. Utilizing feedback tap circuits may help mitigate these indeterminate data eyes and result in odd and even data signals that more closely resemble chart 301 rather than chart 302.

Figure 3:
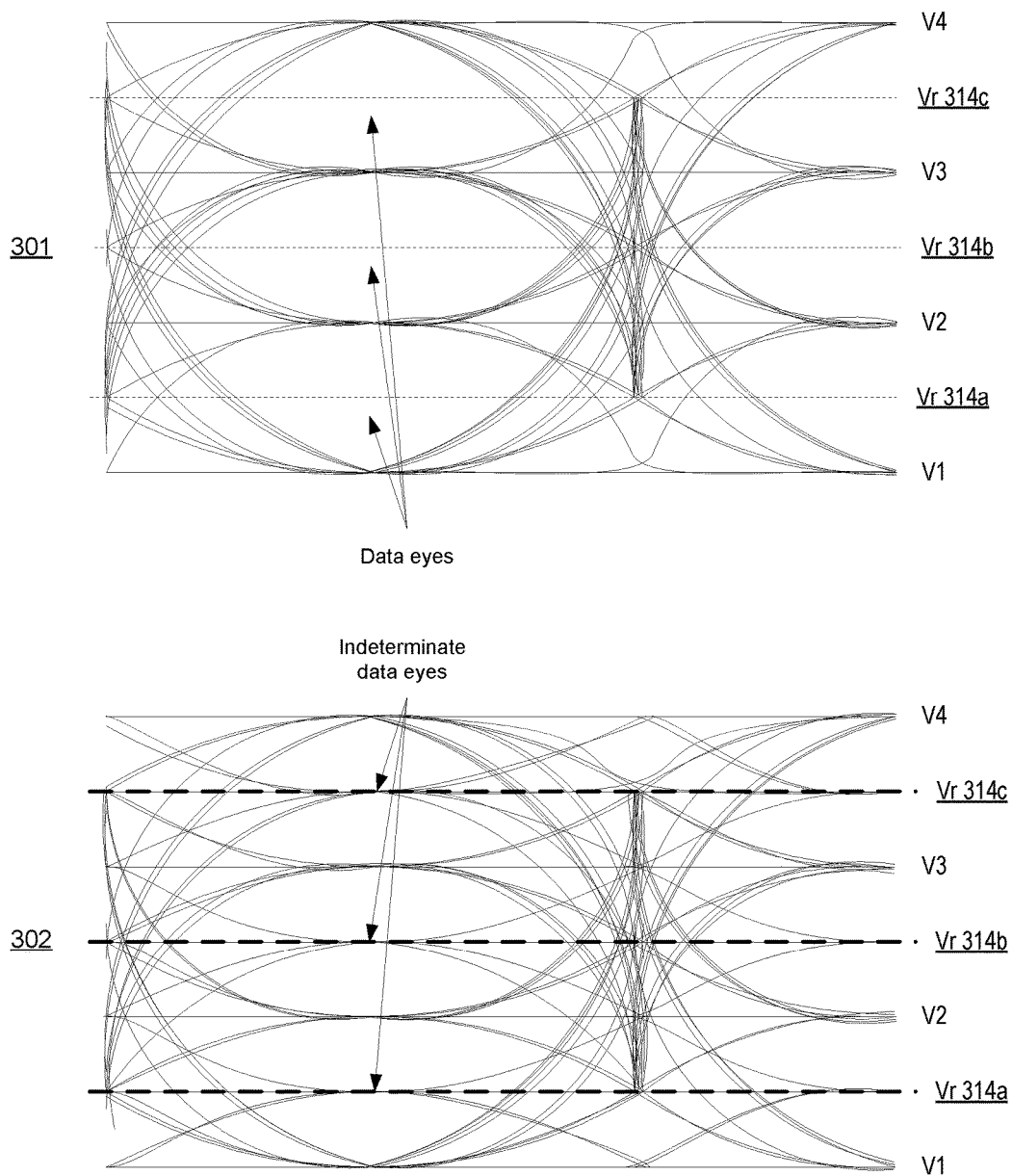
FIG. 3 depicts a timing diagram illustrating two embodiments of serialized data in an embodiment of a serial communication receiver.

It is noted that the waveforms in the timing diagram of FIG. 3 are examples and are presented in a simplified form for demonstration of the disclosed concepts. Actual waveforms may appear different due to many factors including technology used for building actual circuits, topologies of the design, stability of power supplies, and electromagnetic interference from surrounding circuits.

If more feedback tap circuits are utilized, or if the feedback tap circuits include more circuitry, then an amount of capacitance coupled to an output node may increase. Additional capacitance on a high-speed communications node may slow transitions of a signal on the node, thereby reducing a bit rate at which the node may support. Although increasing a size or number of feedback circuits may provide a benefit of reducing effects of ISI, the increased circuit size may have a negative effect of reducing a speed of a serial communication receiver. In the next figure, two circuits for providing feedback to a summation circuit are presented to illustrate their respective impacts to bit rates.

Figure 4A:
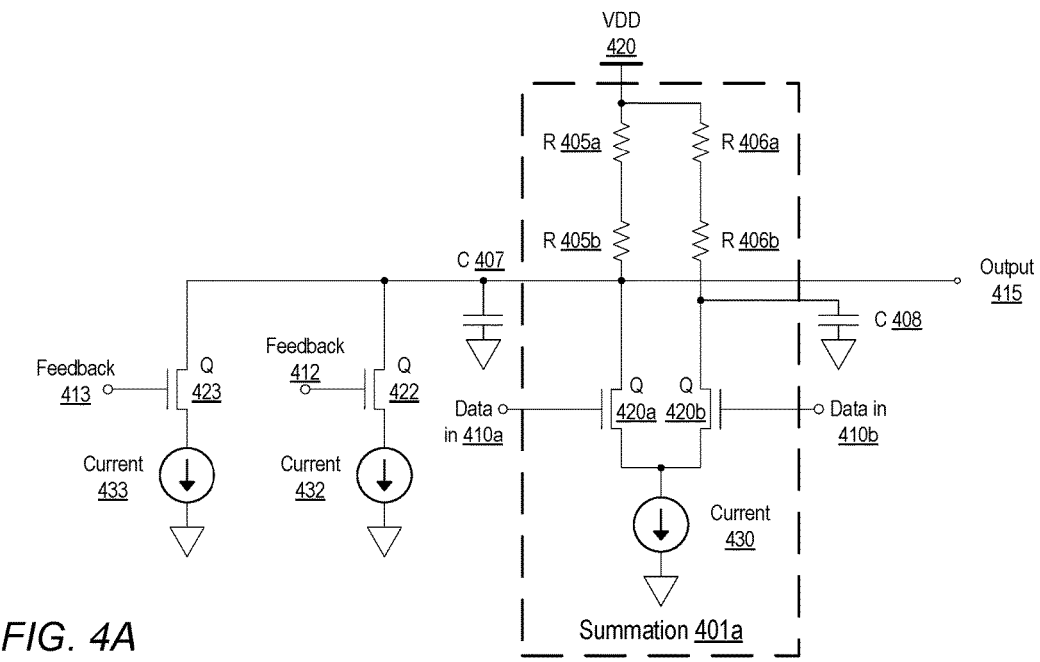
FIG. 4A illustrates an embodiment of a summation circuit included in a DFE circuit.
Figure 4B:
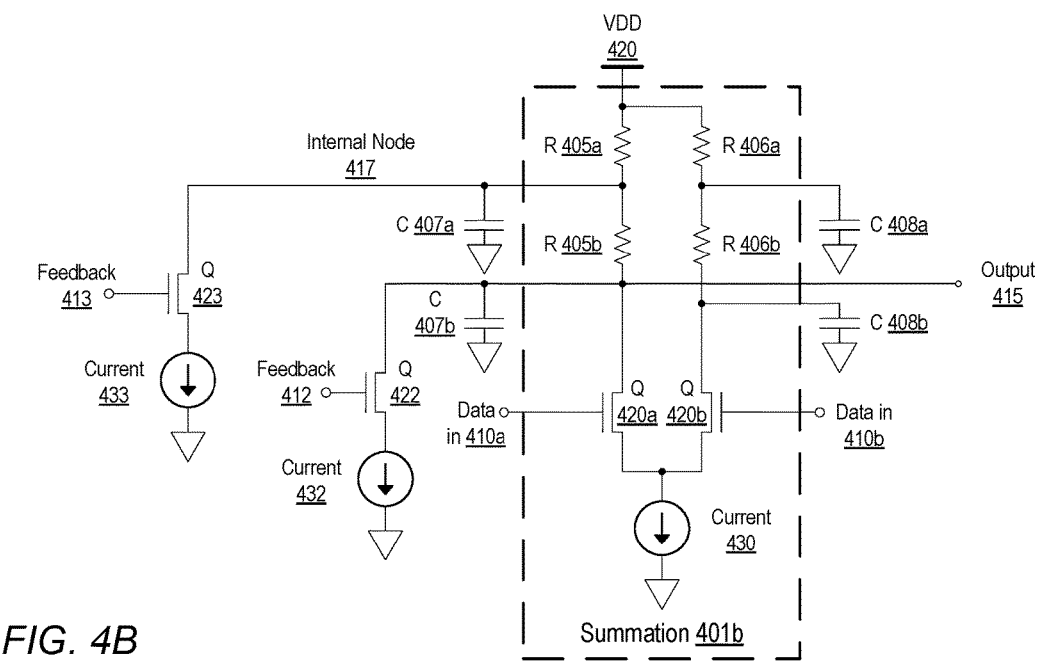
FIG. 4B illustrates another embodiment of a summation circuit included in a DFE.

As described above, DFE circuits may employ a summation circuit to combine the feedback signals with the received signals. Embodiments of such summation circuits are illustrated in FIG. 4A and FIG. 4B. In the illustrated embodiment, both summation circuit 401*a* in FIG. 4A and summation circuit 401*b* in FIG. 4B include resistors R405*a-b* and R406*a-b*, coupled in series between power signal VDD 420 and devices Q420*a* and Q420*b*, which, in turn, are coupled to current sink 430. Each summation circuit 401 includes output node 415 between resistor R405*b* and device Q420*a*. Portions of first and second order feedback tap circuits, including devices Q 422 and Q423 and current sinks 432 and 433, are included for the data in 410*a* side of the two summation circuits. Additional feedback circuits are included in the illustrated embodiment, but are not shown in either of FIG. 4A or FIG. 4B to improve clarity.

In summation circuit 401*a* in FIG. 4A, two portions of feedback tap circuits are shown coupled to output node 415. A first order feedback tap circuit includes device Q422 and current sink 432, controlled by feedback signal 412. A second order feedback tap circuit includes device 423 and current sink 433, controlled by feedback signal 413. Two capacitors are illustrated, C 407 coupled to output node 415 and C 408 coupled between R 408*b* and Q 420*b*. These capacitors represent load and wiring capacitance added by feedback tap circuits. The combination of R 405*a-b* and C 407 results in a formation of an RC network with a time constant (τ1) as shown in equation 1.

$$\tau 1 = (R405a + R405b) \times C407 \qquad (1)$$

R405*a* and R405*b* are the resistance values for resistors R405*a* and R405*b*, respectively. C407 is the capacitance value of capacitor C407, which, in this embodiment, is the capacitance of both the first and second order feedback tap circuits added together. This time constant may impact a slew rate for signal transitions on output node 415 due to transitions of data in 410*a* and feedback signals 412 and 413. It is noted that a similar RC network exist on the data in 410*b* side of summation circuit 401*a*, with a similar time constant based on resistance values of resistor R406*a-b* and capacitance value of capacitor C408.

Summation circuit 401*b* in FIG. 4B also includes portions of two feedback tap circuits. Similar to summation circuit 401*a*, a first order feedback tap circuit is coupled to output node 415 and includes device Q422 and current sink 432, controlled by feedback signal 412. A second order feedback tap circuit is coupled between resistors R405*a* and R405*b*, and includes device Q423 and current sink 433, controlled by feedback signal 413. It is noted that, in contrast to summation circuit 401*a*, the second order feedback tap circuit of summation circuit 401*b* is separated from the first order feedback tap circuit by resistor R405*b*. This separation results in capacitance added by the second order feedback tap circuit being separate from capacitance added by the first order feedback tap circuit. This separation results in a time constant of the RC network that is different from summation circuit 401*a*, as shown in equation 2.

$$\tau 2 = (R405a + R405b) \times C407b + R405a \times C407a \qquad (2)$$

Again, R405*a* and R405*b* are the resistance values for resistor R405*a* and R 405*b*, respectively. C407*a* is the capacitance value of the second order feedback tap circuit and C407*b* is the capacitance of the first order feedback tap circuit. If resistors R405*a* and R405*b* are fabricated to be substantially the same (manufacturing capabilities may limit an ability to make R405*a* and R405*b* exactly the same) and represented simply by "R" and C407*a* and C407*b* are similarly equal and represented by C, then equation 2 may be simplified to equation (3).

$$\tau 2 = (R+R) \times C + R \times C = 3RC \qquad (3)$$

Applying the same simplification to equation 1 results in equation 4.

$$\tau 1 = (R+R) \times (C+C) = 4RC \qquad (4)$$

Comparing equation 3 to equation 4, the time constant τ2 is 25% less than the time constant τ1. This lower time constant may result in slew rates for output node 415 being less for summation circuit 401*b* than for summation circuit 401*a*. Timing diagrams in FIG. 5 illustrate the differences in slew rate for the embodiments of FIG. 4A and FIG. 4B.

Figure 5:
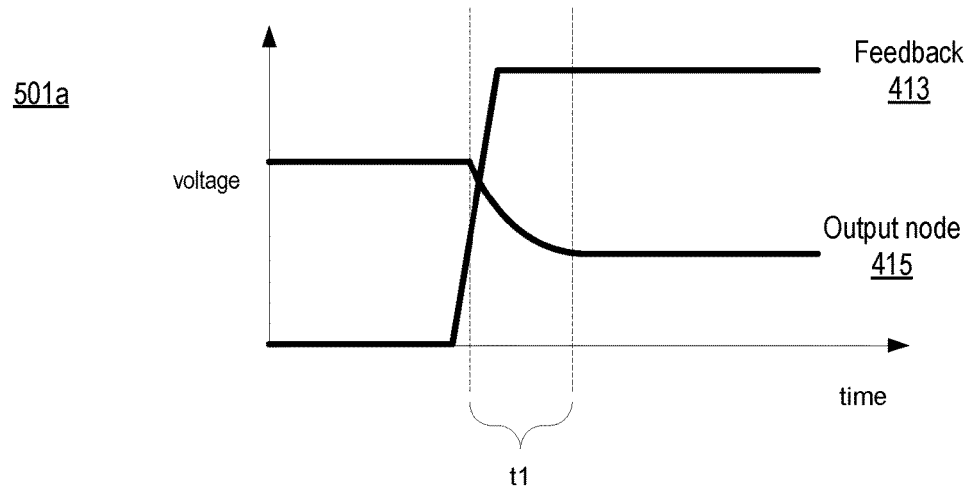
FIG. 5 represents two timing diagrams of signals associated with summation circuits.
Figure 5:
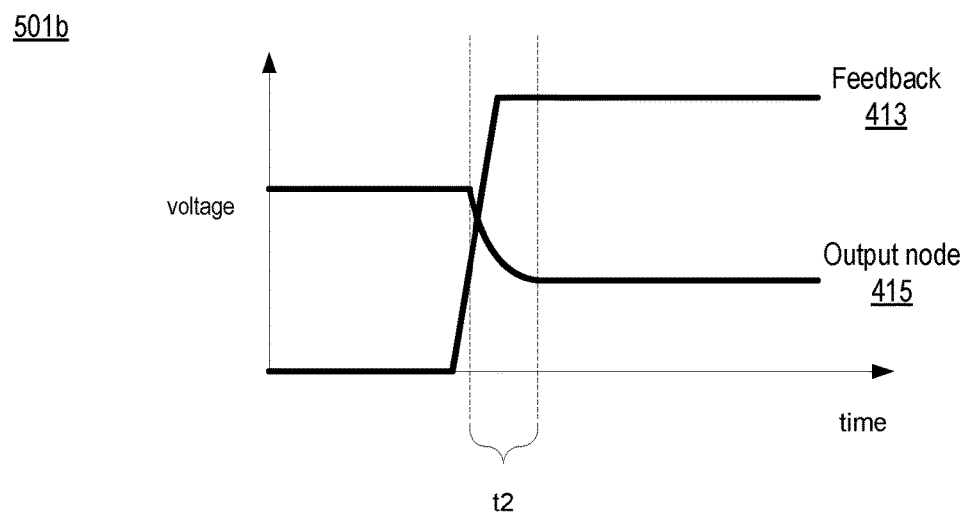

FIG. 5 includes two charts, chart 501*a* and chart 501*b*. Chart 501*a* depicts a signal transition on output node 415 due to a transition of feedback signal 413 in summation circuit 401*a*. Similarly, chart 501*b* depicts a signal transition on output node 415 due to a transition of feedback signal 413 in summation circuit 401*b*. Time t1 corresponds to the slew rate for the signal on output node 415 in summation circuit 401*a*. Likewise, time t2 corresponds to the slew rate for the signal on output node 415 in summation circuit 401*b*. It is noted that the time t2, associated with time constant τ2, is less than time t1, associated with time constant τ1. This reduction of the time constant in summation circuit 401*b* may allow for faster signal transitions on output node 415, and, therefore, a potential for higher data rates.

It is noted that charts 501a and 501b in FIG. 5 are merely examples of timing diagrams for respective embodiments of summation circuits. The waveforms of charts 501a and 501b are simplified for clarity. In other embodiments, the relative scale between charts 501a and 501b may differ. Additionally, the waveforms may include voltage level variations due to noise in adjacent circuits.

Furthermore, it is also noted that the circuits of FIG. 4A and FIG. 4B are simplified embodiments for demonstrating the disclosed concepts. In other embodiments, summation circuits may include additional components such as, for example, additional feedback tap circuits. Additionally, although resistor values and capacitor values were assumed to be equal when determining equations 3 and 4 above, other, suitable and non-equal values may be selected instead.

Figure 6:
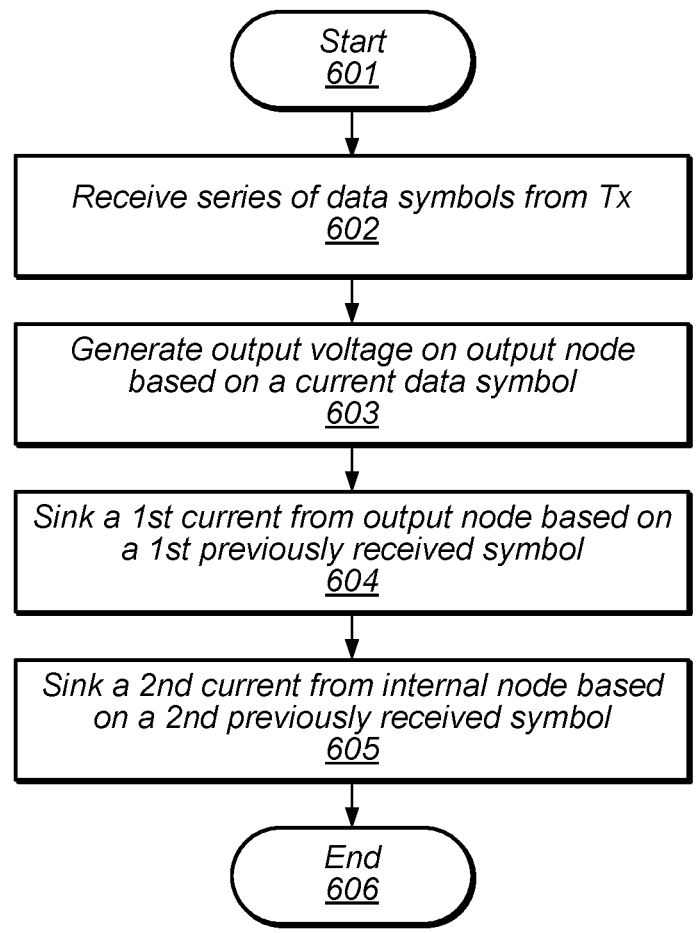
FIG. 6 shows a flow diagram illustrating a method for providing feedback in a DFE circuit included in a serial communication receiver.

Moving now to FIG. 6, an embodiment of a method for providing feedback in a DFE circuit included in a serial communication receiver is shown. This method may be employed in conjunction with the various circuits and systems disclosed herein, such as, for example, serial communication receiver 200 in FIG. 2A, and DFE circuit 100 in FIG. 1. Referring collectively to FIGS. 1 and 6, the method may begin in block 601.

A series of data symbols is received by a DFE circuit (block 602). In the illustrated embodiment, a DFE circuit, such as, e.g., DFE circuit 100 in FIG. 1, receives a series of data symbols via a differential signal including signals data in 110a and data in 110b. Multiple data bits may be encoded into each data symbol of the series, using, for example, PAM-4 encoding.

A voltage level is generated on an output node based on a current data symbol (block 603). Summation circuit 101, in the illustrated embodiment, includes two output nodes, data out 115a and data out 115b. Summation circuit 101 generates a voltage level on data out 115a based on a voltage level of data in 110a, while summation circuit 101 bases a voltage level of data out 115b on the voltage level of data in 110b. In various embodiments, the voltage levels of data out 115a and 115b may increase or decrease in response to an increase of the voltage level of the respective signals, data in 110a and 110b.

A first current is sunk from the output node based on a first previously received data symbol (block 604). Feedback tap circuit 102 includes current sinks 132a-c. Each of current sinks 132a-c is coupled to data out 115a and 115b via one of devices Q122a-f. In the illustrated embodiment, Q122a, 122c, and Q122e couple respective current sinks 132a-c to data out 115a based on feedback signals FB 112a, FB 112c, and FB 112e, respectively. Values for FB 112a, FB 112c, and FB 112e are based on a voltage level of data in 110a for a first order data symbol. If any of FB 112a, 112c, or 112e are asserted, then the corresponding one of devices Q122a, Q122c, or Q122e is enabled, and current from data out 115a is sunk via the respective current sink 132a-c, pulling the voltage level of data out 115a lower. A similar process may sink current from data out 115b using device Q122b, Q122d, and Q122f in conjunction with signals FB 112b, 112d, and 112f. Current sunk from data out 115a and/or data out 115b may mitigate ISI effects due to a first order data symbol.

A second current is sunk from an internal node based on a second previously received data symbol (block 605). Similar to feedback tap circuit 102, feedback tap circuit 103 includes current sinks 133a-c. Instead of data out 115a-b, each of current sinks 133a-c is coupled to internal node 117a and 117b via one of devices Q123a-f. In the illustrated embodiment, feedback tap circuit 103 sinks a current from internal node 117a via current sinks 133a-c based on feedback signals FB 113a, 113c, and 113e. The values of FB 113a, 113c, and 113e are based on a voltage level of data in 110a for a second order data symbol. Likewise, feedback tap circuit 103 sinks a current from internal node 117b via current sinks 133a-c based on feedback signals FB 113b, 113d, and 113f. The values of FB 113b, 113d, and 113f are based on a voltage level of data in 110b for the second order data symbol. Current sunk from internal nodes 117a and/or 117b may mitigate ISI effects due to a second order data symbol. In addition, it is noted that coupling feedback tap circuit 103 to internal nodes 117a-b, rather than to data out 115a-b, may reduce a time constant of an RC network associated with data out 115a and 115b. This reduced time constant may allow for higher slew rates on data out 115a-b and, therefore, may allow for higher data rates through DFE circuit 100.

It is noted that the method illustrated in FIG. 6 is merely an example and that, in other embodiments, different operations may be included. Although the operations illustrated in the method of FIG. 6 are depicted as being performed in a sequential fashion, in some embodiments, some of the operations may be performed in parallel or in a different order.

Figure 7:
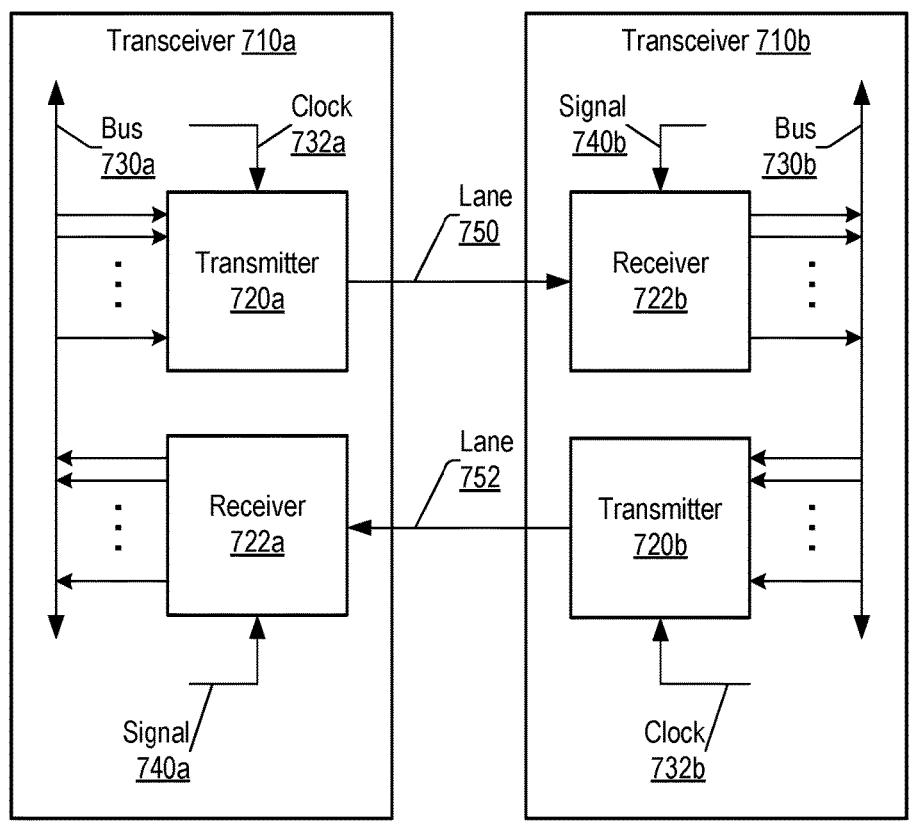
FIG. 7 is a block diagram depicting a serial communication link.

Moving to FIG. 7, a block diagram depicting a serial communication link is depicted. In some embodiments, communication link 700 represents a serial communication system that may include DFE circuits similar to the DFE circuits disclosed herein. Communication link 700 includes transceivers 710a-710b. Although two transceivers are shown in FIG. 7, other embodiments may include a different number of transceivers. Transceivers as described and used herein, may include functional blocks, functional units, routers, chips or chipsets, data transmission buffers such as a transmitter buffer and a receiver buffer, and processors and so forth in a system. As illustrated, transceivers 710a and 710b include transmitters 720a and 720b and receivers 722a and 722b, respectively. Transceivers 710a and 710b may use differential signals and differential transmission lines between them. Functional and control blocks and units used for the data acquisition and processing are not shown for ease of illustration. Transceivers 710a and 710b utilize lanes 750 and 752 for communication.

Parallel data within a given one of transceivers 710a-b may include control, status, address, parity, and data values. In the illustrated embodiment, the parallel data is placed on a respective one of buses 730a and 730b. The parallel data is serialized by transmitter 720a or 720b before transmission on a given one of the lanes 750 and 752. The serialized data is de-serialized by a corresponding receiver 722a or 722b upon reception. For example, regarding lane 750, transceiver 710a is the transmitter and transceiver 710b is the receiver. Regarding lane 752, transceiver 710b is the transmitter and transceiver 710a is the receiver.

Serial transmission protocols may be used on lanes 750 and 752, such as a low voltage differential signaling protocol (LVDS) or differential current mode logic (CIVIL). In some embodiments, data may be serialized into multi-bit data symbols using a data encoding method such as PAM-4, for example. Serial transmitter and receiver circuits may be used by transceivers 710a-710b to perform high-speed serialized data transmission. For example, the transceiver 710a uses transmitter 720a and receiver 722a to form a communication unit. The transceiver 710b uses transmitter 720b and receiver 722b to form a communication unit. Although a single transmitter 720 and receiver 722 are shown for each respective transceiver 710a and 710b, other embodiments may include a different number of transmitters and receivers.

In the embodiment shown, transmitter and receiver circuits within the transceivers 710a-710b utilize an architecture with embedded clock information. Other architectures may be selected and used, in other embodiments. Transceiver 710b is the transmitter for lane 752. The transmitter 720b encodes the parallel data on the bus 730b. The transmitter 720b additionally receives the clock signal 732b. Transmitter 720b combines clock signal 732b with data received from bus 730b onto one serial signal pair on lane 752 as a stream of data symbols.

In various embodiments, the stream of data symbols may have a leading header to indicate valid data is being transmitted. In some embodiments, transmitter 720b may send pseudo-random data to the receiver 722a when transceiver 710b does not have valid data to send. Transceiver 710a may use the pseudo-random data for tuning and calibrating both data and clock recovery circuits. Receiver 722a receives the stream of data symbols and samples each data symbol at a sample time determined during a configuration step. The sampled data is stored in a receive buffer until a complete data word has been read and in some embodiments, also validated. The received data word may then be placed on bus 730a for use by transceiver 710a.

The illustration and description of FIG. 7 are presented as an example of a serial communication link. In other embodiments, various features and functional blocks may differ or be present in different quantities. In other embodiments, wireless communication links may also be utilized.

It is noted that the above-described embodiments may be implemented, in part or in whole, by software stored in a system and executed by a processing unit. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a summation circuit including a first load circuit and a second load circuit coupled to each other at an internal circuit node, and coupled in series between a power supply node and an output node, wherein the summation circuit is configured to:
receive, via a serial communication link, an input signal indicative of a series of data symbols; and
generate an output voltage level on the output node based upon a current data symbol;
a first feedback tap circuit, coupled to the output node, and configured to sink a first current from the output node based upon a first previously received data symbol; and
a second feedback tap circuit, coupled to an intermediate circuit node, wherein the second feedback tap circuit is configured to sink a second current from the intermediate circuit node based upon a second previously received data symbol.

2. The apparatus of claim 1, wherein the first load circuit and the second load circuit include respective resistors with resistance values that are substantially the same.

3. The apparatus of claim 1, wherein to receive the input signal indicative of the series of data symbols, the summation circuit is further configured to receive a differential data input signal including a first data input signal and a second data input signal.

4. The apparatus of claim 3, wherein each data symbol of the series of data symbols encodes a plurality of data bits.

5. The apparatus of claim 4, wherein to generate the first current, the first feedback tap circuit is further configured to receive a plurality of feedback signals with voltage levels corresponding to values of the plurality of data bits encoded in the first previously received data symbol.

6. The apparatus of claim 1, wherein the first previously received data symbol immediately precedes the current data symbol and the second previously received data symbol precedes the first previously received data symbol.

7. The apparatus of claim 1, further comprising:
a third load circuit coupled between a second internal node and the power supply node; and
a third feedback tap circuit coupled to the second internal node.

8. A method comprising:
receiving, by a summation circuit, an input signal indicative of a series of data symbols;
generating, by the summation circuit, an output signal on an output node whose voltage level is based upon a current data symbol;
sinking, by a first feedback tap circuit, a first current from the output node based upon a first previously received data symbol; and
sinking, by a second feedback tap circuit, a second current from an internal circuit node based upon a second previously received data symbol;
wherein the internal circuit node and the output node are coupled via a first load.

9. The method of claim 8, wherein the internal circuit node and a power supply node are coupled via a second load with a resistance that is substantially the same as a resistance of the first load.

10. The method of claim 8, wherein serially receiving each data symbol of the series of data symbols comprises receiving a differential data input signal including a first data input signal and a second data input signal.

11. The method of claim 10, further comprising generating a plurality of data bit values from each data symbol of the series of data symbols.

12. The method of claim 11, wherein generating the first current comprises receiving a plurality of feedback signals corresponding to a value of the first previously received data symbol.

13. The method of claim 8, wherein the first previously received data symbol precedes the current data symbol and the second previously received data symbol precedes the first previously received data symbol.

14. The method of claim 8, further comprising sinking, by a third feedback tap circuit, a third current from another internal circuit node based upon a third previously received data symbol, wherein the another internal circuit node and the internal circuit node are coupled via a second load.

15. A system comprising:
a first decision feedback equalizer (DFE) circuit configured to:
receive an input signal indicative of a series of data symbols;

generate an output voltage level on a first output node based upon a first data symbol;

sink a first current from the first output node based upon a first previously received data symbol; and sink a second current based upon a second previously received data symbol from a first internal circuit node coupled to the first output node via a first load; and a second DFE circuit configured to:

receive the input signal;

generate another output voltage level on a second output node based upon a second data symbol, received subsequently to the first data symbol is received by the first DFE circuit;

sink a third current from the second output node based upon the first data symbol; and sink a fourth current based upon the first previously received data symbol from a second internal circuit node coupled to the second output node via a second load.

16. The system of claim 15, wherein the first internal circuit node and the second internal circuit node are each coupled to a power supply node via a respective third load and fourth load, and wherein each of the first, second, third, and fourth loads include a resistance that is substantially the same.

17. The system of claim 15, wherein to serially receive each data symbol of the series of data symbols, the first DFE circuit and the second DFE circuit are further configured to receive a differential data input signal including a first data input signal and a second data input signal.

18. The system of claim 17, wherein each data symbol of the series of data symbols represents a plurality of data bits.

19. The system of claim 15, wherein to sink the first current, the first DFE circuit is further configured to receive a plurality of feedback signals corresponding to a value of the first previously received data symbol.

20. The system of claim 15, wherein to receive the input signal, the first DFE circuit and the second DFE circuit are configured to receive alternating data symbols of the series of data symbols.

* * * * *

UNITED STATES PATENT AND TRADEMARK OFFICE
CERTIFICATE OF CORRECTION

PATENT NO. : 10,135,643 B1  
APPLICATION NO. : 15/655034  
DATED : November 20, 2018  
INVENTOR(S) : Kong et al.

Page 1 of 1

It is certified that error appears in the above-identified patent and that said Letters Patent is hereby corrected as shown below:

In the Specification

In Column 11, Line 49, delete "122c," and insert -- Q122c, --, therefor.

In Column 12, Line 58, delete "(CIVIL)." and insert -- (CML). --, therefor.

Signed and Sealed this
Twenty-ninth Day of October, 2019

Andrei Iancu
*Director of the United States Patent and Trademark Office*